Figure 1:
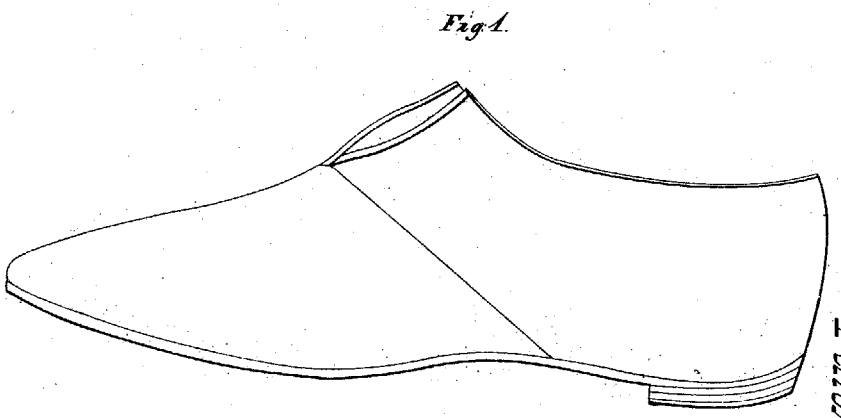
Figure 2:
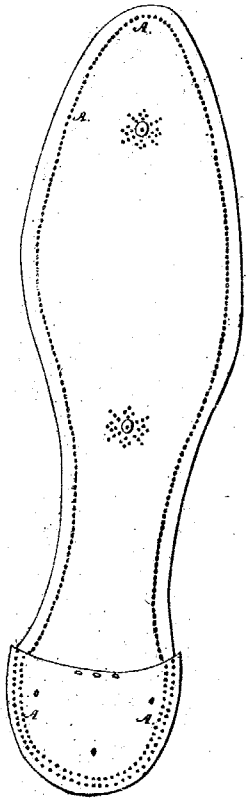

1557X

Hitchcock & Bennett,

Making Shoes,

Patented July 30, 1811.

Samuel B Hitchcock & John Bement
Letters Patent

The Schedule referred to in these Letters Patent and making part of the same containing a description in the words of the said Samuel B Hitchcock and John Bement themselves of their art and mystery of Boot & Shoe making The upper part of the Boot or Shoe being sewed together as was formerly done is put on a last, having the inner sole tacked to it, and is pegged to the inner sole. The tacks which tack ed the inner sole to the last are then drawn out, the out er sole laid on and tacked to the last, It is then pegged quite round from side to side, with one two or more rows of wooden pegs, made of hard seasoned timber equal in size from end to end and driven obliquely quite through to the last. The different pieces of leather to compose the heel are each peg ged on separately with the same kind of pegs made in the same manner, driven in the same direction, but not always through to the last. The inner ends of the pegs are smoothed with an iron Instrument made for the Purpose.

Witnesses
Hastings R Bender
Francis Treat

Samuel B. Hitchcock Seal
John Bement Seal

210 Words

[illegible]

(Patented July 30.1811)